US008341643B2

(12) United States Patent
Fulton et al.

(10) Patent No.: US 8,341,643 B2
(45) Date of Patent: Dec. 25, 2012

(54) PROTECTING SHARED RESOURCES USING SHARED MEMORY AND SOCKETS

(75) Inventors: Michael Fulton, Maple Ridge (CA); Angela Lin, Dublin (IE); Andrew R. Low, Stittsville (CA); Prashanth K. Nageshappa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 12/749,392

(22) Filed: Mar. 29, 2010

(65) Prior Publication Data
US 2011/0239219 A1    Sep. 29, 2011

(51) Int. Cl.
*G06F 3/00* (2006.01)
(52) U.S. Cl. ...................................................... 719/312
(58) Field of Classification Search .................. 719/312
See application file for complete search history.

(56) References Cited

U.S. PATENT DOCUMENTS

| | | | |
|---|---|---|---|
| 5,339,427 A | 8/1994 | Elko et al. | |
| 5,894,583 A * | 4/1999 | Johnson et al. | 710/48 |
| 6,105,098 A | 8/2000 | Ninose et al. | |
| 6,175,879 B1 * | 1/2001 | Shah et al. | 719/330 |
| 6,189,007 B1 | 2/2001 | Boonie et al. | |
| 6,314,501 B1 | 11/2001 | Gulick et al. | |
| 6,519,623 B1 | 2/2003 | Mancisidor | |
| 6,687,702 B2 | 2/2004 | Vaitheeswaran et al. | |
| 6,823,458 B1 | 11/2004 | Lee et al. | |
| 6,826,439 B1 * | 11/2004 | Barber et al. | 700/108 |
| 7,162,666 B2 | 1/2007 | Bono | |
| 7,299,476 B2 | 11/2007 | Baudry et al. | |
| 7,444,634 B2 | 10/2008 | Jeyaram | |
| 7,603,502 B2 | 10/2009 | Richter et al. | |
| 8,131,983 B2 * | 3/2012 | Babich | 712/228 |
| 2002/0156934 A1 * | 10/2002 | Gregg et al. | 709/319 |
| 2005/0149933 A1 | 7/2005 | Saito et al. | |
| 2007/0143755 A1 * | 6/2007 | Sahu et al. | 718/100 |
| 2007/0157200 A1 | 7/2007 | Hopkins | |
| 2008/0109807 A1 * | 5/2008 | Rosenbluth | 718/102 |
| 2009/0158299 A1 | 6/2009 | Carter | |
| 2010/0138685 A1 * | 6/2010 | Kass | 714/2 |

OTHER PUBLICATIONS

Mendel Rosenblum, The Impact of Architecture Trends on Operating System Performance, 1995.*
"Distributed Lock Manager", printed from en.wikipedia.org/wiki/Distributed_lock_manager on Mar. 29, 2010, 5 pages.

(Continued)

*Primary Examiner* — Lechi Truong
(74) *Attorney, Agent, or Firm* — Marcia L. Doubet

(57) ABSTRACT

Shared memory and sockets are used to protect shared resources where multiple operating systems execute concurrently on the same hardware. Rather than using spinlocks for serializing access, when a thread is unable to acquire a shared resource because that resource is already held by another thread, the thread creates a socket with which it will wait to be notified that the shared resource has been released. The sockets may be network sockets or in-memory sockets that are accessible across the multiple operating systems; if sockets are not available, communication technology that provides analogous services between operating systems may be used instead. Optionally, fault tolerance is provided to address socket failures, in which case one or more threads may fall back (at least temporarily) to using spinlocks. A locking service may execute on each operating system to provide a programming interface through which threads can invoke lock operations.

16 Claims, 13 Drawing Sheets

OTHER PUBLICATIONS

Burrow, Mike. "The Chubby lock service for loosely-coupled distribution systems", Google Inc., printed from static.googleusercontent.com/external_content/untrusted_dlcp/labs.google.com/en/us/papers/chubby-osdi06.pdf on Mar. 29, 2010, 16 pages.

"Parallel Sysplex—Fault Tolerance from IBM", the Availability Digest, Apr. 2008, printed from availabilitydigest.com/public_artricles/0304/ibm_sysplex.pdf on Mar. 29, 2010, 6 pages.

* cited by examiner

| crossGuestLock: | |
|---|---|
| int cg_lock; | *105* |
| int guest_id; | *110* |
| int thread_id; | *115* |
| int queue_lock; | *120* |
| waiterAddr *queue; | *125* |

150

| waiterAddr: | |
|---|---|
| sockaddr guest_addr; | *155* |
| int guest_id; | *160* |
| int thread_id; | *165* |
| waiterAddr *next; | *170* |

| crossGuestLock: | |
|---|---|
| int cg_lock; | *405* |
| int guest_id; | *410* |
| int thread_id; | *415* |
| int queue_lock; | *420* |
| waiterAddr *queue; | *425* |
| bool owner_socket_available; | *430* |

*450*

| waiterAddr: | |
|---|---|
| sockaddr guest_addr; | *455* |
| int guest_id; | *460* |
| int thread_id; | *465* |
| waiterAddr *next; | *470* |

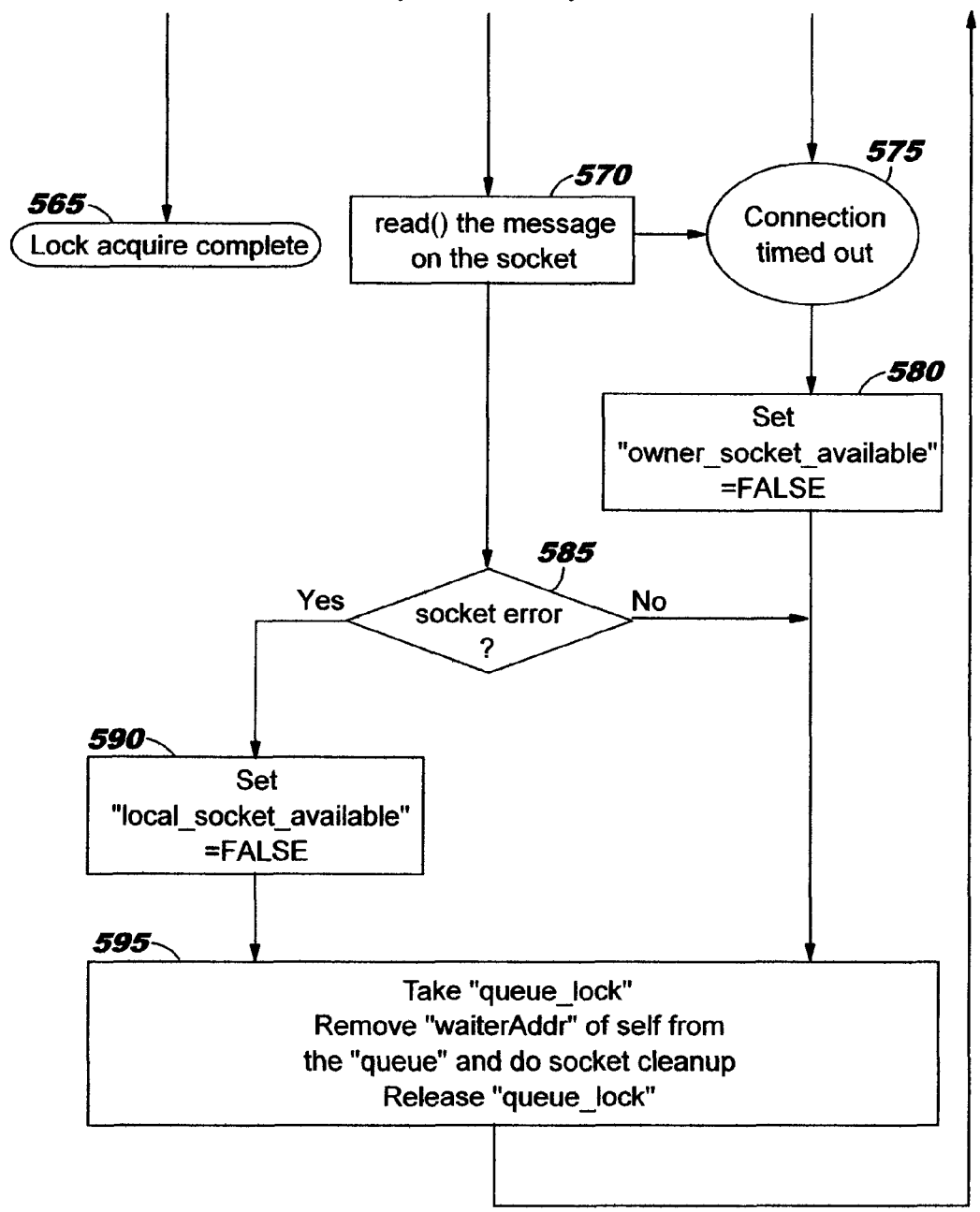

| crossGuestLock: | |
|---|---|
| int cg_lock; | *705* |
| int guest_id; | *710* |
| int thread_id; | *715* |
| int queue_lock; | *720* |
| waiterAddr *queue; | *725* |

750

| waiterAddr: | |
|---|---|
| sockaddr cgls_addr; | *755* |
| int guest_id; | *760* |
| int thread_id; | *765* |
| int lock_ID; | *770* |
| waiterAddr *next; | *775* |

780 cv_table: *785*  *790*

| Lock_ID1 | cv1 |
|---|---|
| Lock_ID2 | cv2 |
| Lock_ID3 | cv3 |
| Lock_ID4 | cv4 |
| ... | ... |
| Lock_IDn | cvn |

PROTECTING SHARED RESOURCES USING SHARED MEMORY AND SOCKETS

BACKGROUND

The present invention relates to computing environments, and deals more particularly with protecting shared resources in an environment where multiple operating systems are executing concurrently on the same hardware.

Computing systems are known where multiple operating systems are executing concurrently on the same hardware. The hardware system is sometimes said to be "hosting" the operating systems, and an operating system in such an environment is sometimes referred to as a "guest" (or "guest operating system") which is hosted by the hardware system. The term "hypervisor" is sometimes used to refer to software or firmware that allows the multiple operating systems to execute concurrently.

BRIEF SUMMARY

The present invention is directed to protecting shared resources. In one aspect, this comprises protecting a shared resource by: storing, in shared memory accessible to at least a first thread and a second thread which execute concurrently in the computing system, a lock data structure for serializing access to the shared resource, the first thread executing under control of a first operating system hosted by the computing system and the second thread executing under control of a second operating system hosted by the computing system; and upon detecting, by the first thread, that a lock provided by the lock data structure is already held, using a socket to block while waiting for the lock to be released. Optionally, a locking service may execute on each of the first and second operating systems, where this locking service provides a programming interface through which the threads invoke operations for holding and releasing the lock on the shared resource. (If socket technology is not available in a particular implementation, for example in an environment that does not use the Transmission Control Protocol, communication technology that provides analogous services between operating systems may be used instead of sockets.) In another aspect, fault tolerance is provided to address potential failures. In this aspect, the first thread preferably uses a spinlock to suspend execution while waiting for the lock to be released, rather than using the socket to block, if the first thread encounters a socket error. The first thread also preferably uses a spinlock to suspend execution while waiting for the lock to be released, rather than using the socket to block, if the first thread observes a variable setting that indicates that a thread holding the lock encountered a socket failure. Optionally, the above-noted locking service may be used with this aspect. Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 1 illustrates sample data structures 100, 150 for providing a cross-guest lock to serialize access to a shared resource;

FIG. 4 illustrates sample data structures 400, 450 for providing a cross-guest lock to serialize access to a shared resource in an embodiment that provides fault tolerance;

FIG. 7 illustrates sample data structures 700, 750, 780 for providing a cross-guest lock to serialize access in an aspect that provides a cross-guest locking service;

DETAILED DESCRIPTION

Figure 2:
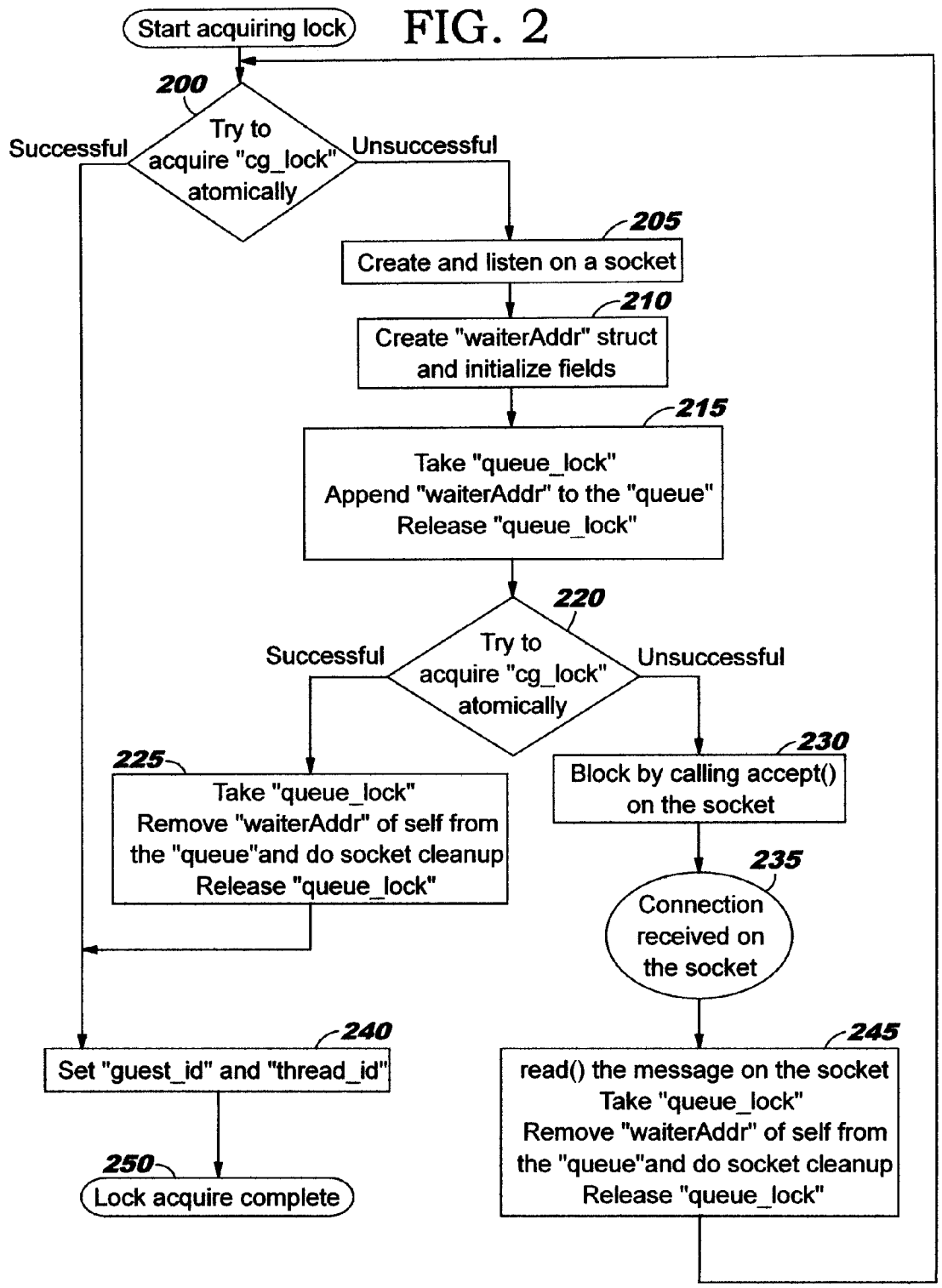
FIG. 2 provides a flowchart depicting logic which may be used when acquiring a cross-guest lock.

When multiple operating systems are executing concurrently on a single computing system, it becomes necessary to ensure that shared resources accessed by the operating systems are protected. For example, if a particular file is accessed by an application executing under a first operating system, other applications executing under different operating systems should be subject to concurrency control to ensure that they do not corrupt the file—such as by changing or deleting portions of the file which are being used by the application executing under the first operating system. Similarly, other resources that are shareable among the hosted guest operating systems, such as shared memory (which may be used, by way of example, for communication among the guests), should also be subject to concurrency control. This concurrency control is also referred to as providing serialized access or synchronized access to the shared resources.

Embodiments of the present invention are directed toward protecting shared resources in an environment where multiple operating systems are hosted concurrently on a single hardware system. The protection may be described as "cross-guest" protection, reflecting the protection of resources in use by an application executing under control of one guest operating system from corruption by an application executing under control of another of the guest operating systems. More particularly, the threads or processes executing as part of an application on one guest are protected from corruption by threads or processes executing as part of an application on a different guest. Access to the shared resources is preferably synchronized through spinlocks and sockets, thereby providing serialized access to the shared resources, as will be described. (If socket technology is not available in a particular implementation, for example in an environment that does not use the Transmission Control Protocol, communication technology that provides analogous services between operating systems may be used instead.)

Problems of concurrency control are well known, and a number of techniques for protecting shared resources have been developed. As one example of such techniques, distributed locking mechanisms and locking services are known. However, the present inventors are not aware of distributed locking mechanisms or locking services that take advantage of the fact that multiple operating systems are hosted on the same hardware. As another example of known techniques for protecting shared resources, synchronization mechanisms like semaphores and mutexes are commonly used with standard operating systems. However, the present inventors are not aware of implementations where these synchronization mechanisms are accessible across guests, and therefore shared resources which are used by threads or processes executing under control of the various guests are inadequately protected from access by other threads or processes. Use of so-called "spinlocks" is another known technique, whereby a lock is used to enforce serialized access to a resource, and a thread or process waiting to access a resource which is in use by a different thread waits in a loop—or "spins"—while repeatedly checking to see if the lock has been released. The repeated checking used in this known technique, however, results in high CPU utilization. Particularly in situations where the lock may be held for a relatively long duration, the known spinlock approach may be quite inefficient. (For ease of reference, the term "thread" is used hereinafter to refer to the work unit that is executing, where a thread generally performs processing of code from an application program.)

An embodiment of the present invention provides synchronization by locking shared resources in a way that works across guests, taking advantage of the fact that the guests are hosted on the same hardware. Hypervisors often provide cross-guest sharing/communication mechanisms such as shared memory and sockets with which the guest operating systems can communicate. Embodiments of the present invention leverage the cross-guest shared memory and sockets to achieve synchronization across the collection of guests which are hosted on a given hardware. In a first aspect, shared memory is used to provide "cross-guest locks"—that is, locks that are accessible across the guests—and sockets are used to determine when these locks become available, rather than the iterative checking technique of known spinlocks. The sockets may be network sockets or in-memory sockets that are accessible across the guests. In a second aspect, which is an optional alternative to the first aspect, fault tolerance is added to protect against socket failure scenarios. Using sockets, as disclosed herein, enables the high CPU utilization of known spinlocks to be avoided even when locks are held for relatively long periods of time. Optionally, a cross-guest locking service may be provided on each guest operating system, and preferably reduces socket and port usage by sharing a single socket among all waiting threads of that guest.

The first aspect will now be described with reference to FIGS. 1-3. The second aspect will then be described with reference to FIGS. 4-6. The optional cross-guest locking service will be described with reference to FIGS. 7-10.

FIG. 1 illustrates sample data structures 100, 150 for providing a cross-guest lock to serialize access to a shared resource, where these data structures are preferably stored in cross-guest shared memory and are therefore accessible by the multiple guest operating systems. One implementation of these data structures will now be described.

Referring first to "crossGuestLock" data structure 100, a field "cg_lock" 105 is used to store a value that indicates whether the lock is currently held by a thread. Preferably, a zero value (or alternatively, a Boolean "false") is used to indicate that the lock is not in use. A field "guest_id" 110 and a field "thread_id" 115 store values derived from an identifier of the operating system and from an identifier of the thread executing under control of that operating system, respectively, that hold the lock when "cg_lock" is non-zero. (Typically, the operating system identifier is assigned to a particular operating system by the hypervisor that controls the multiple concurrently-executing operating systems, and the thread identifier is assigned by the operating system under control of which a particular thread is executing. The actual assigned values may be used in fields 110 and 115; alternatively, other values derived therefrom may be used.) A field "queue_lock" 120 is provided as a lock for synchronizing access to a field "queue" 125. The lock provided by field 120 will typically be held for only a relatively short period, and may therefore be implemented as a conventional spinlock. The field "queue" 125 provides a queue of instances of "waiterAddr" data structure 150 (where this queue may be implemented, by way of example, as a linked list in which each queued instance points to the next queued instance).

An instance of "waiterAddr" data structure 150 is created in shared memory for each thread that is waiting to acquire the cross-guest lock provided by data structure 100. A field "guest_addr" 155 stores an address of a socket on which this waiting thread is listening (as discussed in more detail below). Fields "guest_id" 160 and "thread_id" 165 store values derived from the operating system and thread identifier, respectively, of the thread for which this instance of data structure 150 was created (where those values 160, 165 may be derived as discussed above with regard to identifiers 110, 115). Field "next" 170 stores a pointer to the next (if any) instance of the "waiterAddr" data structure 150 in the queue provided by "queue" field 125, where that next instance represents another thread that is also waiting on the same cross-guest lock.

The individual cross-guest lock used for protecting a particular shared resource may be located in various ways, using techniques which are beyond the scope of the present invention. As one example, a mapping may be consulted, using an identifier of the resource as a key to locate an entry that stores a location of the cross-guest lock for that resource. As another example of locating a cross-guest lock for a resource, a lock structure may be stored in a known location that is associated with a larger cross-guest shared memory structure used for a collection of cross-guest locks. As still another example, the cross-guest lock for a particular shared resource may be located using a path name known to the guest operating systems.

A flowchart depicting logic which may be used when acquiring a cross-guest lock is provided in FIG. 2, as will now be discussed.

Any thread from any guest that wants to obtain the cross-guest lock for a particular shared resource—and thereby safely access the shared resource—will first try to get hold of the cross-guest lock using atomic operations. (Techniques for using atomic operations, as well as advantages thereof, are well known. Accordingly, a detailed discussion thereof is therefore not provided herein.) At Block 200, an atomic operation is used when a thread tries to acquire the cross-guest lock for a particular shared resource. With reference to data structure 100, the cross-guest lock for a resource can be acquired when "cg_lock" 105 is set to zero (or "false", alternatively), and the atomic operation also sets "cg_lock" 105 to a non-zero value (or "true", alternatively) in this case to protect the cross-guest lock from being simultaneously acquired by a second thread. (Optionally, the attempt to acquire the lock atomically may be retried for a fixed number of iterations if the lock is not immediately available. Field "cg_lock" 105 may therefore be implemented as a conventional spinlock.) If acquiring the cross-guest lock is successful, control reaches Block 240, which sets the "guest_id" 110 and "thread_id" 115 values of the cross-guest lock data structure 100 stored in shared memory so that those values identify the thread which has now acquired the lock. Acquiring the cross-guest lock is then complete, and processing of FIG. 2 for this thread then exits (as indicated at Block 250).

If Block 200 determines that another thread already holds the cross-guest lock, however, then the attempt to acquire the lock is not successful. Control therefore reaches Block 205, which begins a process for using a socket for waiting until the cross-guest lock is released. Block 205 creates this socket, which will listen for changes to the cross-guest lock. The socket is preferably created on an unused port to prevent receiving messages unrelated to the cross-guest lock, and, as will be discussed further with reference to Block 230, the thread which is attempting to acquire the cross-guest lock listens on the socket until data arrives. (Techniques for creating sockets, and for listening on a socket, are well known in the art and a detailed discussion thereof is not presented herein.) Before the thread blocks by listening on the socket, a new instance of the "waiterAddr" data structure 150 is created at Block 210 to enable this thread to wait in the queue 125 until the cross-guest lock is released. Block 210 also initializes the fields of this newly-created data structure 150 to store details pertaining to this waiting thread (i.e., the thread which failed to acquire the cross-guest lock at Block 200). In particular, the "guest_addr" field 155 is set to the address of the newly-created socket; the "guest_id" 160 and "thread_id" 165 fields are set to identifier values that represent the waiting thread (as discussed above with regard to FIG. 1); and the "next" field 170 is preferably initialized to a null value.

The "queue" field 125 of data structure 100 represents a queue of the threads that are waiting to acquire the cross-guest lock provided by this particular instance of data structure 100. In order to safely add the newly-created and newly-initialized "waiterAddr" 150 instance to this queue, Block 215 acquires a lock on the queue using the "queue_lock" field 120, preferably by setting field 120 to a non-zero value; once that lock is acquired, the "waiterAddr" 150 instance is appended to the queue, and the lock on the queue is then released by resetting the "queue_lock" field 120 to a zero value. As will be understood by those of ordinary skill in the art, appending the "waiterAddr" 150 instance preferably comprises locating the last of the previously-queued instances, and setting the "next" field 170 of that located instance to point to the "waiterAddr" 150 instance which is being appended; "queue" pointer 125 is also set to point this "waiterAddr" instance if the queue was previously empty.

Block 220 then makes another attempt to acquire the cross-guest lock atomically. As discussed with reference to Block 200, an atomic operation is used, and the value "cg_lock" 105 is tested to determine whether the cross-guest lock can be acquired (and again, this may be retried for a fixed number of iterations if the lock is not immediately available). If acquiring the cross-guest lock is successful (indicating that the cross-guest lock was released during the processing of Blocks 205-215), control reaches Block 225 which removes the current thread from the queue of threads that are waiting for the cross-guest lock 100. To safely remove this thread's queued "waiterAddr" 150 instance, the processing at Block 225 preferably comprises acquiring the lock on the queue using the "queue_lock" field 120 by setting field 120 to a non-zero value; removing this thread's "waiterAddr" 150 instance from the queue represented by "queue" field 125 once the lock on the queue is acquired; performing socket clean-up; and then releasing the lock on the queue by resetting the "queue_lock" field 120 to a zero value. Removing the thread's "waiterAddr" 150 instance from the queue preferably comprises ensuring that the "next" pointer 170 of another queued entry does not point to this removed instance 150 and that the value of "queue" field 125 also does not point to this removed instance 150. The socket clean-up may comprise destroying the socket instance which was created at Block 205 (or, as an alternative, returning the socket instance to a pool of available sockets) and removing the present thread as a listener on that socket.

Following the processing at Block 225, control reaches Block 240 which sets the "guest_id" 110 and "thread_id" 115 values as discussed earlier, thereby updating data structure 100 to indicate that this thread is now holding the cross-guest lock. Acquiring the cross-guest lock is then complete, and processing of FIG. 2 for this thread then exits (as indicated at Block 250).

When the attempt to acquire the cross-guest lock at Block 220 is not successful, control reaches Block 230 which blocks the thread by calling "accept( )" on the socket which was created at Block 205. The thread will remain blocked until a connection is received on the socket. Receiving this connection, indicated at Block 235, will be triggered when the thread that was holding the cross-guest lock releases that lock and sends data on the socket on which this thread is waiting.

Responsive to the waiting thread being unblocked, Block 245 issues a "read( )" to remove the incoming message from the socket. Block 245 then removes the current thread from the queue of threads that are waiting for the cross-guest lock. As discussed with reference to Block 225, the processing at Block 245 safely removes this thread's queued "waiterAddr" 150 instance by acquiring the lock on the queue using the "queue_lock" field 120, preferably by setting field 120 to a non-zero value; removing this thread's "waiterAddr" 150 instance from the queue represented by "queue" field 125 once the lock on the queue is acquired; performing socket clean-up; and then releasing the lock on the queue by resetting the "queue_lock" field 120 to a zero value. Processing then returns to Block 200, which attempts to acquire the newly-released cross-guest lock on behalf of this now-unblocked thread.

It may happen that this thread, after being unblocked, reaches Block 200 after some other thread has already acquired the recently-released cross-guest lock. In that case, the unblocked thread waits again, using a new "waiterAddr" 150 instance, by repeating the logic that begins at Block 205.

Once the thread that is accessing a shared resource has finished its access, it releases the cross-guest lock for that resource. A flowchart depicting logic which may be used when releasing a cross-guest lock is provided in FIG. 3, as will now be discussed.

At Block 300, the "guest_id" 110 and "thread_id" 115 values of the cross-guest lock data structure 100 stored in shared memory are reset, which preferably comprises setting the fields to null or zero values. The cross-guest lock is then released at Block 305, which preferably comprises setting "cg_lock" 105 to zero.

Block 310 then begins a process of safely accessing the shared "queue" field 125 to find a "waiterAddr" instance 150 for a thread that is waiting to acquire this cross-guest lock. Block 310 therefore acquires the lock on the queue using the "queue_lock" field 120. This preferably comprises setting field 120 to a non-zero value. Block 315 then checks the value of the "queue" field 125 to determine whether the queue is empty (which may be represented by a null value). If the test at Block 315 has a positive result, then processing continues at Block 320, which releases the lock on the empty queue by resetting the "queue_lock" field 120 to a zero value. The process of releasing the cross-guest lock is then complete, and processing of FIG. 3 for this thread then exits (as indicated at Block 340).

When the queue of threads waiting to acquire the cross-guest lock is not empty, control reaches Block 325, which obtains the first of the queued "waiterAddr" instances 150 and then releases the lock on the queue by resetting the "queue_lock" field 120 to a zero value. At Block 330, the thread which is releasing the cross-guest lock creates a socket and uses that socket to connect to the socket address represented by the "guest_addr" field 155 from the "waiterAddr" 150 instance obtained at Block 325. The thread releasing the cross-guest lock then sends data on that socket at Block 335, which will cause the listening thread to unblock, as has been discussed above with reference to Block 235 of FIG. 2. Socket clean-up may also be performed at Block 335. (Note that the "waiterAddr" 150 instance obtained at Block 325 will be removed from the queue represented by "queue" field 125 when the unblocked thread performs the processing of Block 245.) The process of releasing the cross-guest lock is then complete, and processing of FIG. 3 for this thread then exits (as indicated at Block 340).

Referring now to the second aspect discussed above, fault tolerance is added in this aspect to provide recovery from socket failure scenarios. If a socket failure is detected, an embodiment of this aspect falls back temporarily to using only spinlocks, and forgoes use of sockets until the socket failure can be addressed.

Socket failures addressed by this aspect may be generally identified as falling into two categories: socket errors and socket time-outs. In a socket error scenario, socket calls such as create, listen, read, and send return an error code upon failure. These errors can generally be viewed as problems with a local socket or socket service of a thread that uses a socket to wait for a lock. In a socket time-out scenario, a thread may block indefinitely on a socket. Socket time-outs can generally be viewed as problems with a socket or socket service of the thread that currently owns a cross-guest lock on which other threads are waiting.

These socket failures are preferably addressed using two flags (that is, two Boolean values) that maintain information about the status or "health" of sockets. A flag referred to herein as "local_socket_available" is a thread local flag that keeps tracks of the health of socket services for a particular thread. This flag therefore addresses the socket error scenario discussed above. A flag referred to herein as "owner_socket_available" is a shared flag that keeps track of the health of socket services on the thread which currently owns a particular cross-guest lock. For ease of reference, these flags are referred to hereinafter as the "LSA" and "OSA" flags, respectively.

The LSA flag is set to "true" when a thread first starts to access or allocate a cross-guest lock for the first time. This establishes a default value indicating that there are no known problems with sockets for this thread. If a socket error is subsequently encountered, the LSA flag for that thread is set to "false", indicating that local sockets are not working for this thread; therefore, this thread should not use a socket to block while waiting to acquire the cross-guest lock.

The OSA flag is part of the cross-guest lock structure, as will be discussed below with reference to field 430 in FIG. 4. When the OSA flag is set to "false", it is possible that the thread currently holding the cross-guest lock is unable to use its socket to send data. Other waiting threads, upon detecting this "false" setting of the OSA flag, will therefore not try to block using sockets. If a different thread subsequently takes the cross-guest lock, and that thread is not having a socket-related fault, then the OSA flag will be set to "true" (see Block 555 of FIG. 5) and responsive to detecting this "true" value, the other waiting threads can then return to using sockets for blocking. (Waiting threads for which the LSA flag is set to "false", however, will continue to use spinlocks rather than sockets.)

Fault tolerance techniques disclosed for this second aspect enable using socket services when possible, and falling back to spinlocks only for the duration of socket-related faults.

FIG. 4 illustrates sample data structures 400, 450 for providing a cross-guest lock to serialize access to a shared resource in an aspect providing fault tolerance, where these data structures are preferably stored in cross-guest shared memory and are therefore accessible by the multiple guest operating systems. One implementation of these data structures will now be described.

Fields 405-425 of "crossGuestLock" data structure 400 are preferably analogous to fields 105-125 of data structure 100, which were discussed above with reference to FIG. 1. The "owner_socket_available" field 430 is preferably implemented as a Boolean field to provide a shared flag, which has been discussed above as the OSA flag. The "waiterAddr" data structure 450 comprises fields 455-470, which are preferably analogous to fields 155-170 of data structure 150.

Figure 5:
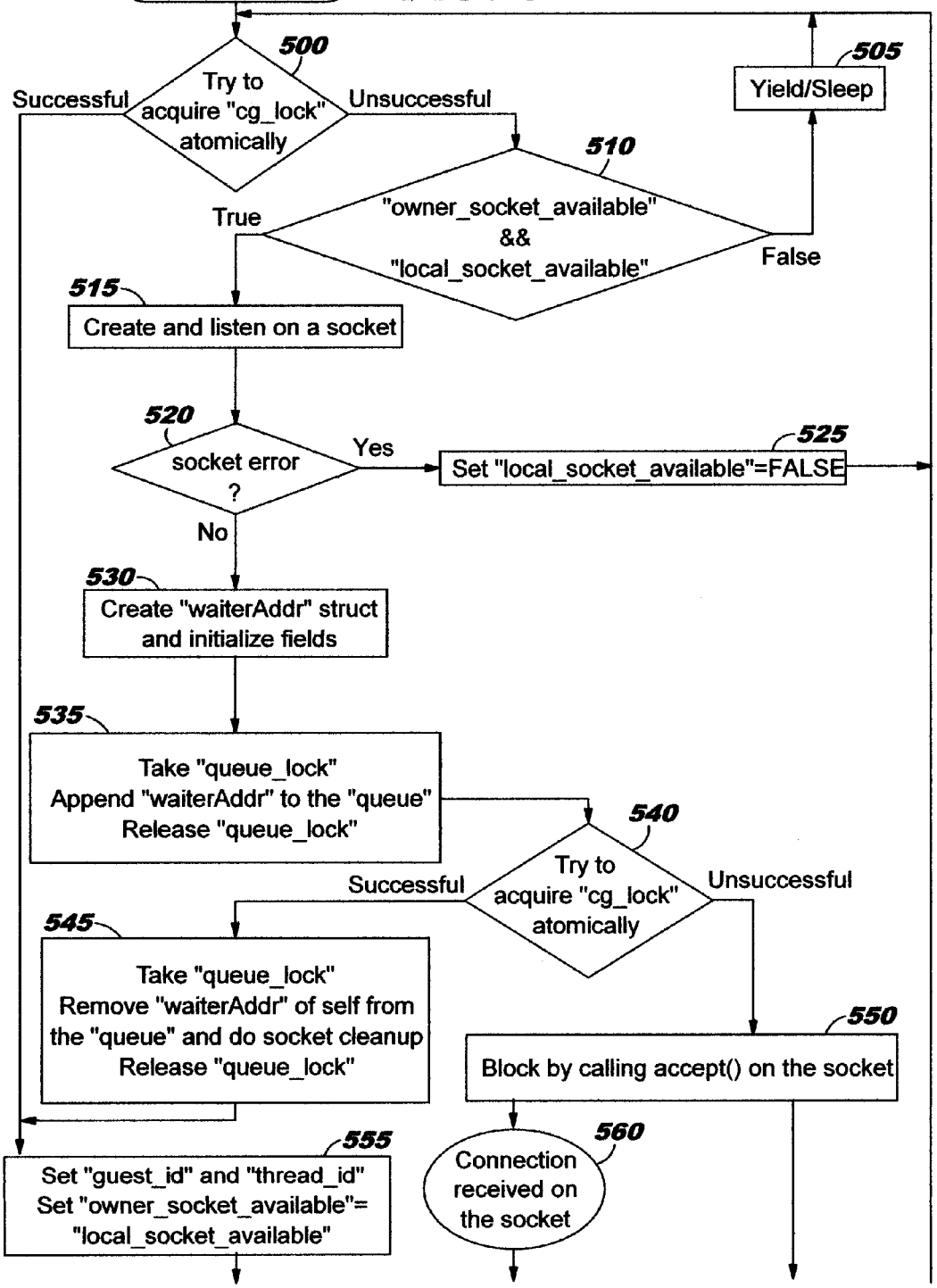
FIG. 5 provides a flowchart depicting logic which may be used when acquiring a cross-guest lock in an embodiment that provides fault tolerance.

Referring now to FIG. 5, a flowchart is provided therein depicting logic which may be used when acquiring a cross-guest lock in an aspect of the present invention that provides fault tolerance, as will now be discussed.

At Block 500, an atomic operation is used when a thread tries to acquire the cross-guest lock for a particular shared resource. With reference to data structure 500, the cross-guest lock for a resource can be acquired when "cg_lock" 405 is set to zero (or "false", alternatively), and the atomic operation also sets "cg_lock" 405 to a non-zero value (or "true", alternatively) in this case to protect the cross-guest lock from being simultaneously acquired by a second thread. (Optionally, the attempt to acquire the lock atomically may be retried for a fixed number of iterations if the lock is not immediately available. Field "cg_lock" 405 may therefore be implemented as a conventional spinlock.) If acquiring the cross-guest lock is successful, control reaches Block 555, which sets the "guest_id" 410 and "thread_id" 415 values of the cross-guest lock data structure 400 stored in shared memory so that those values identify the thread which has now acquired the lock. Block 555 also sets the value of the OSA flag stored at 430 to the same value as the acquiring thread's LSA flag value. Acquiring the cross-guest lock is then complete, and processing of FIG. 5 for this thread then exits (as indicated at Block 565).

Note that the OSA flag 430 is not being accessed under control of a lock in preferred embodiments. It is believed that the information held by this flag is not critical, and that reading an incorrect value (e.g., due to timing issues) should not result in incorrect handling or in exposure of a shared resource.

If Block 500 determines that another thread already holds the cross-guest lock, then the attempt to acquire the lock is not successful. Control therefore reaches Block 510, which tests whether the OSA flag 430 and the LSA flag of the thread attempting to acquire the lock are both set to "true"—that is, whether the flags indicate that socket failures have not been detected for the thread owning the cross-guest lock or for the thread attempting to acquire the lock. If this test has a positive result, then it may be presumed that using sockets to acquire the cross-guest lock will not encounter a socket-related fault; processing therefore continues at Block 515, which begins a process for using a socket for waiting until the cross-guest lock is released.

If the test at Block 510 has a negative result, on the other hand, then it is presumed that a socket-related fault has been detected (as represented by the OSA and/or LSA flag), and this thread will therefore attempt to acquire the cross-guest lock by falling back (at least temporarily) to a conventional spinlock approach. Optionally, a yield or sleep may be implemented, as shown at Block 505, prior to re-attempting to acquire the cross-guest lock using the "cg_lock" field 405 at Block 500. It may happen that the socket-related fault(s) is/are resolved during a subsequent iteration of the test at Block 510, in which case the thread will then use the socket approach which begins at Block 515 rather than the spinlock approach. For example, the socket fault may have occurred because the thread owning the cross-guest lock simply held the lock for too long, resulting in a timeout that caused the OSA flag to be set to "false". This scenario will cause all threads that attempt to acquire the cross-guest lock to temporarily fall back to using spinlocks. (Care should therefore be taken to set the socket timeout to a value that is longer than the maximum expected hold time of the cross-guest lock.)

Block 515 is reached when a socket will be used by the thread that is attempting to acquire the cross-guest lock. Block 515 creates this socket, which will listen for changes to the cross-guest lock. The socket is preferably created on an unused port to prevent receiving messages unrelated to the cross-guest lock, and, as will be discussed further with reference to Block 550, the thread which is attempting to acquire the cross-guest lock listens on the socket until data arrives. After creating the socket, Block 520 tests whether a socket error is detected. If so, processing continues at Block 525, which sets the LSA flag to "false" to indicate that this thread will now use spinlocks rather than sockets. Accordingly, control returns to Block 500 to again attempt to acquire the cross-guest lock rather than waiting on a socket to be notified that the lock has become available.

When the test at Block 520 has a negative result, this indicates that processing can continue using sockets for this thread. Control therefore reaches Block 530, which creates a new instance of the "waiterAddr" data structure 450 to enable this thread to wait in the queue 425 until the cross-guest lock is released. Block 530 also initializes the fields of this newly-created data structure 450 to store details pertaining to this waiting thread (i.e., the thread which failed to acquire the cross-guest lock at Block 500). In particular, the "guest_addr" field 455 is set to the address of the newly-created socket; the "guest_id" 460 and "thread_id" 465 fields are set to identifier values that represent the waiting thread; and the "next" field 470 is preferably initialized to a null value.

The "queue" field 425 of data structure 400 represents a queue of the threads that are waiting to acquire the cross-guest lock provided by this particular instance of data structure 400. In order to safely add the newly-created and newly-initialized "waiterAddr" 450 instance to this queue, Block 535 acquires a lock on the queue using the "queue_lock" field 420, preferably by setting field 420 to a non-zero value; once that lock is acquired, the "waiterAddr" 450 instance is appended to the queue, and the lock on the queue is then released by resetting the "queue_lock" field 420 to a zero value. As will be understood by those of ordinary skill in the art, appending the "waiterAddr" 450 instance preferably comprises locating the last of the previously-queued instances, and setting the "next" field 470 of that located instance to point to the "waiterAddr" 450 instance which is being appended; "queue" pointer 425 is also set to point this "waiterAddr" instance if the queue was previously empty.

Block 540 then makes another attempt to acquire the cross-guest lock atomically. As discussed with reference to Block 500, an atomic operation is used, and the value "cg_lock" 405 is tested to determine whether the cross-guest lock can be acquired (and again, this may be retried for a fixed number of iterations if the lock is not immediately available). If acquiring the cross-guest lock is now successful, control reaches Block 545 which removes the current thread from the queue of threads that are waiting for the cross-guest lock 400. To safely remove this thread's queued "waiterAddr" 450 instance, the processing at Block 545 preferably comprises acquiring the lock on the queue using the "queue_lock" field 420 by setting field 420 to a non-zero value; removing this thread's "waiterAddr" 450 instance from the queue represented by "queue" field 425 once the lock on the queue is acquired; performing socket clean-up; and then releasing the lock on the queue by resetting the "queue_lock" field 420 to a zero value. Removing the thread's "waiterAddr" 450 instance from the queue preferably comprises ensuring that the "next" pointer 470 of another queued entry does not point to this removed instance 450 and that the value of "queue" field 425 also does not point to this removed instance 450. The socket clean-up may comprise destroying the socket instance which was created at Block 515 (or, as an alternative, returning the socket instance to a pool of available sockets) and removing the present thread as a listener on that socket.

Following the processing at Block 545, control reaches Block 555 which sets the "guest_id" 410 and "thread_id" 415 values as discussed earlier, thereby updating data structure 400 to indicate that this thread is now holding the cross-guest lock. Block 555 also sets the OSA flag 430 to the value of this acquiring thread's LSA flag. Acquiring the cross-guest lock is then complete, and processing of FIG. 5 for this thread then exits (as indicated at Block 565).

When the attempt to acquire the cross-guest lock at Block 540 is not successful, control reaches Block 550 which blocks the thread by calling "accept( )" on the socket which was created at Block 515. The thread will remain blocked until a connection is received on the socket. Receiving this connection, indicated at Block 560, will be triggered when the thread that was holding the cross-guest lock releases that lock and sends data on the socket on which this thread is waiting.

Responsive to the waiting thread being unblocked, Block 570 issues a "read( )" to remove the incoming message from the socket. When the "read( )" returns, Block 585 tests whether a socket error has been encountered. If so, processing continues at Block 590, which sets the LSA flag to "false". This thread will then fall back to using spinlocks. Following Block 590, and also when a socket error is not detected at Block 585, processing reaches Block 595, which removes this thread from the queue of threads that are waiting for the cross-guest lock. As discussed with reference to Block 545, the processing at Block 595 safely removes this thread's queued "waiterAddr" 450 instance by acquiring the lock on the queue using the "queue_lock" field 420, preferably by setting field 420 to a non-zero value; removing this thread's "waiterAddr" 450 instance from the queue represented by "queue" field 425 once the lock on the queue is acquired; performing socket clean-up; and then releasing the lock on the queue by resetting the "queue_lock" field 420 to a zero value. Processing then returns to Block 500, which attempts to acquire the newly-released cross-guest lock on behalf of this thread.

It may happen that a timeout occurs on the socket responsive to either the "accept( )" at Block 550 or the "read( )" at Block 570, as indicated by Block 575. In this case, the OSA flag 430 is set to "false" at Block 580. As noted earlier, this will cause all threads that attempt to acquire the cross-guest lock to (at least temporarily) fall back to using spinlocks, because it appears that the thread holding the cross-guest lock may have a socket fault which will prevent using sockets to notify waiting threads when the lock is released—and accordingly, the waiting threads should not block using sockets. Accordingly, after setting the OSA flag to "false", processing continues at Block 595, which removes this thread from the queue of threads that are waiting for the cross-guest lock as discussed above. Control then returns to Block 500, where this now-unblocked thread will attempt to acquire the newly-released cross-guest lock.

Figure 6:
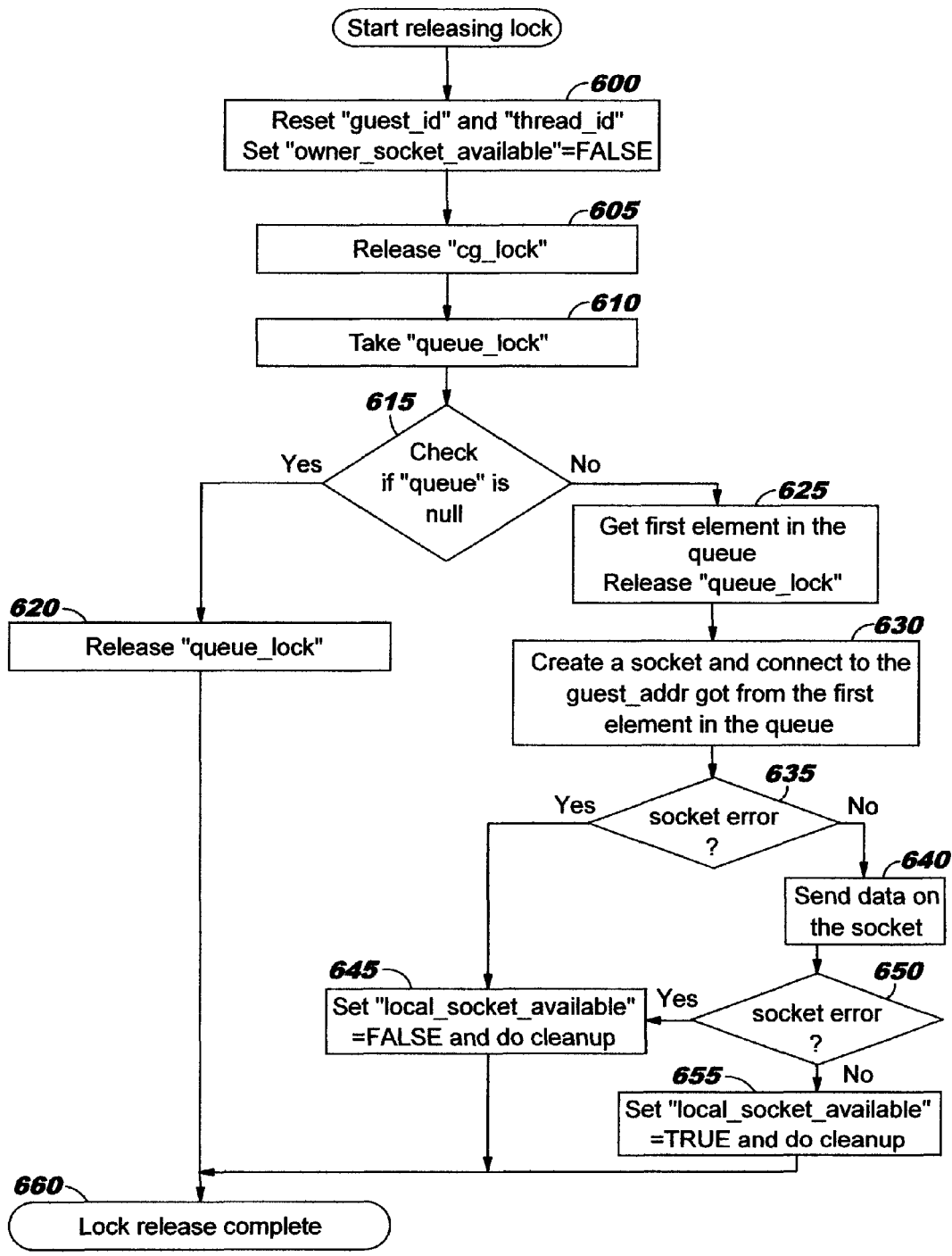
FIG. 6 provides a flowchart depicting logic which may be used when releasing a cross-guest lock in an embodiment that provides fault tolerance.

Once the thread that is accessing a shared resource has finished its access, it releases the cross-guest lock for that resource. FIG. 6 provides a flowchart depicting logic which may be used when releasing a cross-guest lock in an aspect of the present invention that provides fault tolerance, as will now be discussed.

At Block 600, the "guest_id" 410 and "thread_id" 415 values of the cross-guest lock data structure 400 stored in shared memory are reset, which preferably comprises setting the fields to null or zero values. Block 600 also preferably sets the OSA flag 430 to "false": because it is not known which thread will be the next owner of the cross-guest lock that is being released, setting the OSA flag 430 to "false" prior to the release provides a conservative approach. (In an alternative approach, this setting of the OSA flag 430 at Block 600 may be omitted, in which case the OSA flag remains set to the value which was established by the most-recent execution of Block 555 of FIG. 5.) The cross-guest lock is then released at Block 605, which preferably comprises setting "cg_lock" 405 to zero.

Block 610 then begins a process of safely accessing the shared "queue" field 425 to find a "waiterAddr" instance 450 for a thread that is waiting to acquire this cross-guest lock. Block 610 therefore acquires the lock on the queue using the "queue_lock" field 420. This preferably comprises setting field 420 to a non-zero value. Block 615 then checks the value of the "queue" field 425 to determine whether the queue is empty (which may be represented by a null value). If the test at Block 615 has a positive result, then processing continues at Block 620, which releases the lock on the empty queue by resetting the "queue_lock" field 420 to a zero value. The process of releasing the cross-guest lock is then complete, and processing of FIG. 6 for this thread then exits (as indicated at Block 660).

When the queue of threads waiting to acquire the cross-guest lock is not empty, control reaches Block 625, which obtains the first of the queued "waiterAddr" instances 450 and then releases the lock on the queue by resetting the "queue_lock" field 420 to a zero value. At Block 630, the thread which is releasing the cross-guest lock creates a socket and uses that socket to connect to the socket address represented by the "guest_addr" field 455 from the "waiterAddr" 450 instance obtained at Block 625. Block 635 tests whether a socket error has been encountered. If so, then in one approach, Block 645 sets the LSA flag for this thread to "false" to indicate that the thread should not use sockets for blocking. It may happen that connect/send operations on the socket of the thread releasing the cross-guest lock will fail because the target socket is bad, which does not reflect negatively on the releasing thread's ability to continue using sockets; accordingly, an alternative approach may omit the setting of the LSA flag in Block 645. Block 645 also performs socket clean-up. After the processing of Block 645, this iteration of FIG. 6 is then complete (as indicated by Block 660).

When the test in Block 635 has a negative result (i.e., a socket error was not detected), the thread releasing the cross-guest lock then sends data on that socket at Block 640, which will cause the listening thread to unblock, as has been discussed above with reference to Block 560 of FIG. 5. (Note that the "waiterAddr" 450 instance obtained at Block 625 will be removed from the queue represented by "queue" field 425 when the unblocked thread performs the processing of Block 595.) In a preferred embodiment of the fault-tolerant aspect, the LSA flag is not checked prior to sending data on the socket at Block 640. This ensures that an attempt is always made to unblock the listening thread using socket services.

Block 650 then tests whether a socket error is detected. If so, then processing continues as described above for a positive result for the test at Block 635; otherwise, when a socket error is not detected at Block 650, Block 655 sets the LSA flag to "true". Block 655 may also perform socket clean-up. Note that Block 655 is reached when all socket operations are successful during the lock release processing. Accordingly, setting the LSA flag to "true" enables returning to use of sockets for this thread during its next attempt to acquire a cross-guest lock, even though the thread's LSA flag may have previously been set to "false" from an earlier socket-related fault. The process of releasing the cross-guest lock is then complete, and processing of FIG. 6 for this thread then exits (as indicated at Block 660).

The processing of FIGS. 2-3 and 5-6 has been described above as being performed by the threads which are accessing shared resources. In the depicted processing, each thread which needs to wait on a cross-guest lock uses a socket (and a port) for blocking. The number of available ports is typically limited (on the order of 65,536), and therefore if a very high number of threads are waiting for cross-guest locks, then high port usage may result. In an optional enhancement to the above-described aspects, port usage may be reduced by running a "cross-guest locking service", or "CGLS", on each guest operating system, as will now be described.

The CGLS provides a programming interface that can be invoked by the threads. The CGLS on each guest may implement the sockets discussed above as logical sockets (that is, as a socket emulation layer), whereby the CGLS intercepts the socket operations which have been described above and then multiplexes those socket operations over one physical socket. Accordingly, rather than using one socket for each waiting thread, the CGLS reduces socket usage by using one socket per guest, sharing that socket among all of the guest's threads which are waiting on any cross-guest lock.

FIG. 7 illustrates sample data structures 700, 750, 780 for providing a cross-guest lock to serialize access to a shared resource in an aspect that provides a cross-guest locking service. These data structures are preferably stored in cross-guest shared memory and are therefore accessible by the multiple guest operating systems. One implementation of these data structures will now be described.

Fields 705-725 of "crossGuestLock" data structure 700 are preferably analogous to fields 105-125 of data structure 100, which were discussed above with reference to FIG. 1. The "waiterAddr" data structure 750 comprises fields 755-775. Of these, fields 760, 765, 775 are preferably analogous to fields 160, 165, 170 of data structure 150. Field 755 provides a socket address, similar to field 155, however this socket address at 755 now identifies a socket on which a CGLS is listening (as will be discussed in more detail below). Each cross-guest lock preferably has a specific lock identifier when using a CGLS, and this lock identifier is stored in the "lock_ID" field 760 of the "waiterAddr" data structure 750 when a thread attempts to acquire the cross-guest lock but is not successful. Thus, an instance of the "waiterAddr" 750 identifies which thread is waiting, as well as which cross-guest lock that thread is waiting on.

The CGLS on a particular host preferably associates a condition variable with each of the cross-guest locks, and the waiting threads then wait on this condition variable rather than waiting on a socket. Thus, the CGLS on each guest maintains a "cv_table" 780 that stores a mapping between the lock identifiers and their associated condition variable. Sample lock identifiers are presented in column 785, and sample corresponding condition variables are presented in column 790.

Figure 8:
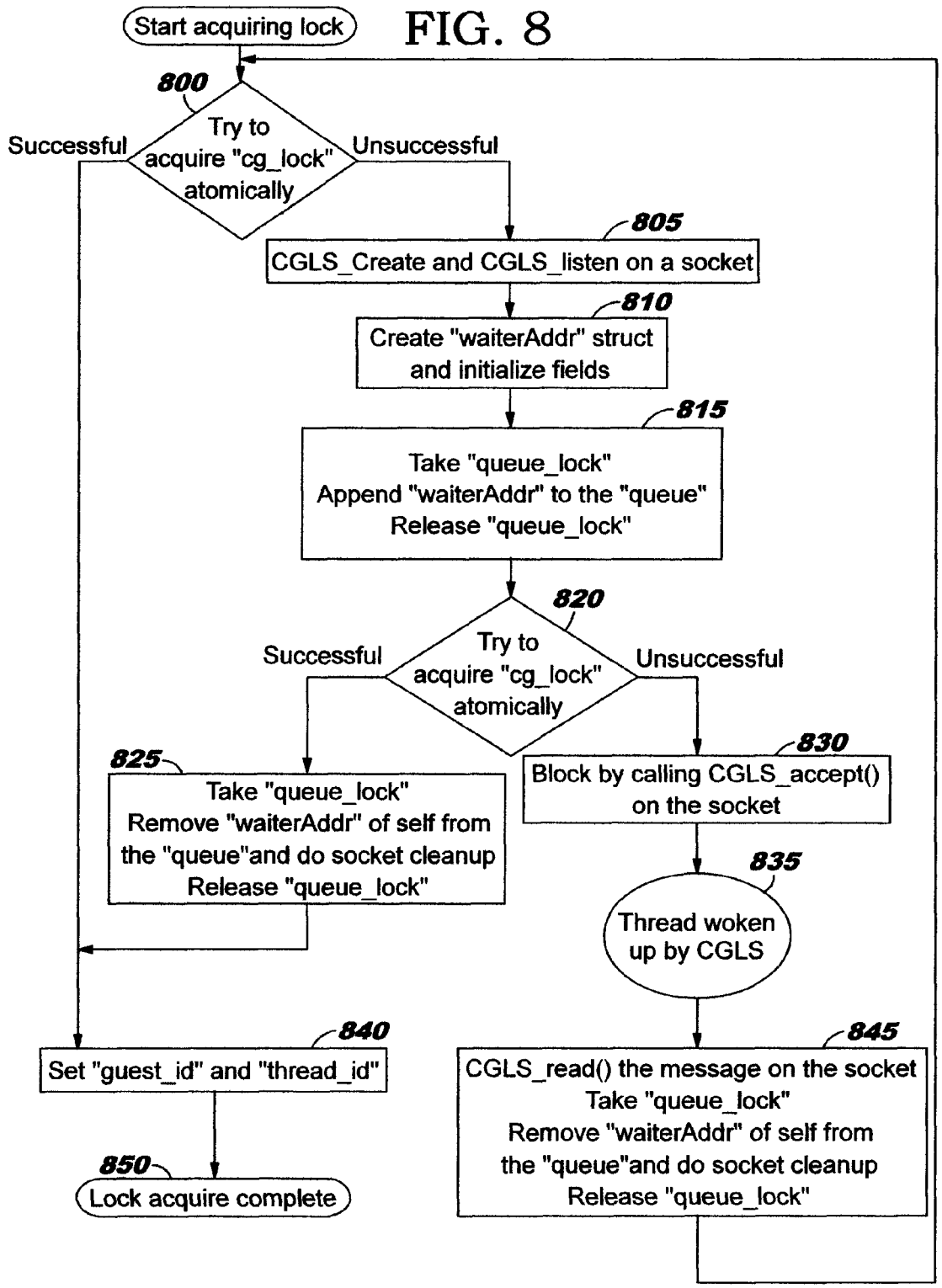
FIG. 8 provides a flowchart depicting logic which may be used when acquiring a cross-guest lock in an aspect that provides a cross-guest locking service.

A flowchart depicting logic which may be used when acquiring a cross-guest lock in an aspect of the present invention that uses a cross-guest locking service is provided in FIG. 8. The processing of Blocks 800-850 of FIG. 8 is analogous to the processing of Blocks 200-250 of FIG. 2, and use of data structures 700, 750 in FIG. 8 is analogous to use of data structures 100, 150 in FIG. 2, except as will now be described.

When CGLS is used, socket operations like create, listen, accept, and read will be intercepted when attempting to acquire a cross-guest lock. Accordingly, when an attempt to acquire the cross-guest lock (using atomic operations) at Block 800 is not successful, a "CGLS create" operation and a "CGLS listen" operation at Block 805 are intercepted, and rather than actually creating a new socket and then listening on that socket, the thread which is attempting to acquire the cross-guest lock will now use the shared socket provided by the CGLS of that thread's guest. To enable the CGLS to provide listener and wake-up operations for the thread, the unique lock identifier associated with the cross-guest lock is obtained, and an entry is added to the cv_table 780, if it does not already exist, that associates the lock identifier and a condition variable corresponding to this lock identifier. The intercepted operations then return the address of the shared socket.

When Block 810 creates an instance of "waiterAddr" 750 and initializes this instance, values for fields 760, 765, 775 are created in a manner analogous to initializing fields 160, 165, 175 (as has been discussed above with reference to Block 210 of FIG. 2). The "cgls_addr" field 755 is initialized to the address of the shared socket, which is returned from the operations in Block 805. The "lock_ID" field 770 is set to the unique identifier of the cross-guest lock for which the acquire attempt failed at Block 800.

When Block 820 attempts to acquire the cross-guest lock atomically and the attempt is unsuccessful, control reaches Block 830. Block 830 blocks the thread that wants to acquire the cross-guest lock by calling "CGLS_accept( )" on the socket which was created at Block 805. Because this operation is intercepted, and does not block on an actual socket, it is implemented as waiting on the condition variable associated with the unique lock identifier of the cross-guest lock. That is, the thread will remain blocked until awakened by a notification from the CGLS. (The CGLS will send the wake-up notification responsive to receiving a connection for this lock identifier on the shared socket, and this will be triggered when the thread that was holding the cross-guest lock releases that lock and sends data on the shared socket, as discussed in more detail below with reference to FIG. 10.)

Responsive to the waiting thread being unblocked by the notification from the CGLS at Block 835, Block 845 issues a "CGLS_read( )" to read a message from the socket which was created at Block 805. However, because a socket was not actually created for the thread, there is no message for the thread to read, and for purposes of FIG. 8, the intercepted read operation may simply return.

Note that the socket clean-up operations referenced in Blocks 825 and 845 do not destroy a socket instance, as the socket belongs to the CGLS and therefore persists beyond use by a single thread.

Once the thread that is accessing a shared resource has finished its access, it releases the cross-guest lock for that resource. A flowchart depicting logic which may be used when releasing a cross-guest lock in an aspect that provides a cross-guest locking service is provided in FIG. 9. The processing of Blocks 900-940 FIG. 9 is analogous to the processing which was described for Blocks 300-340 of FIG. 3, and use of data structures 700, 750 in FIG. 9 is analogous to use of data structures 100, 150 in FIG. 3, except as will now be described.

After determining that the queue of threads waiting to acquire the cross-guest lock is not empty (Block 915) and obtaining the first of the queued "waiterAddr" instances 750 and releasing the lock on the queue by resetting the "queue_lock" field 720 to a zero value (Block 925), control reaches Block 930. At Block 930, the thread which is releasing the cross-guest lock creates a socket and uses that socket to connect to the socket address represented by the "cgls_addr" field 755 from the "waiterAddr" 750 instance obtained at Block 925. Notably, this field 755 contains the address of the shared socket for the CGLS. The thread releasing the cross-guest lock then sends data, including the value from the "lock_ID" field 770 of the "waiterAddr" instance 750 obtained at Block 925, on the socket at Block 935. Sending this data will cause the CGLS to awaken a blocked thread which is waiting to acquire the cross-guest lock having this lock identifier from field 770, as was mentioned above with reference to Block 835 of FIG. 8, and as will be discussed in further detail below with reference to FIG. 10. Socket clean-up may also be performed at Block 935.

Figure 3:
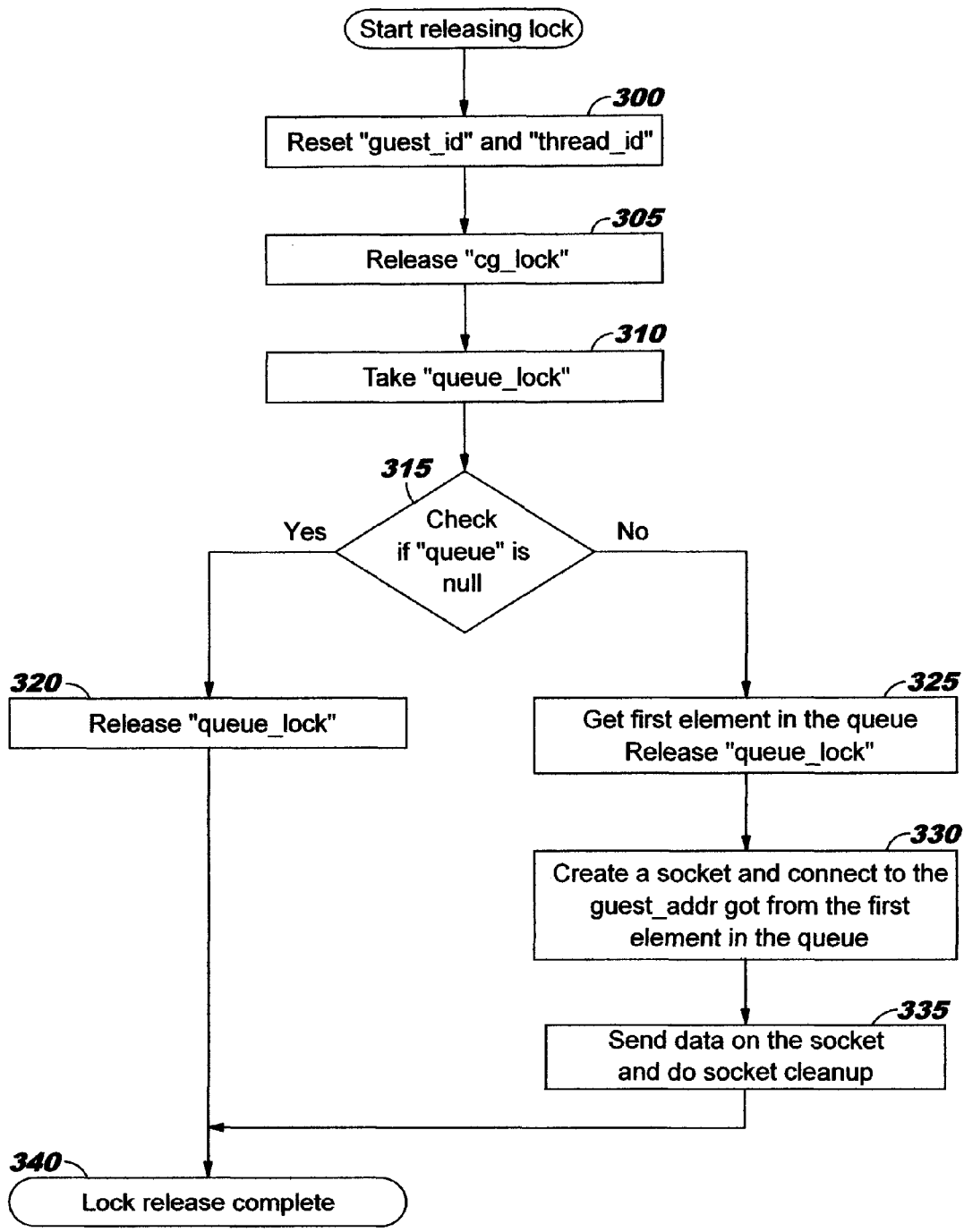
FIG. 3 provides a flowchart depicting logic which may be used when releasing a cross-guest lock.
Figure 9:
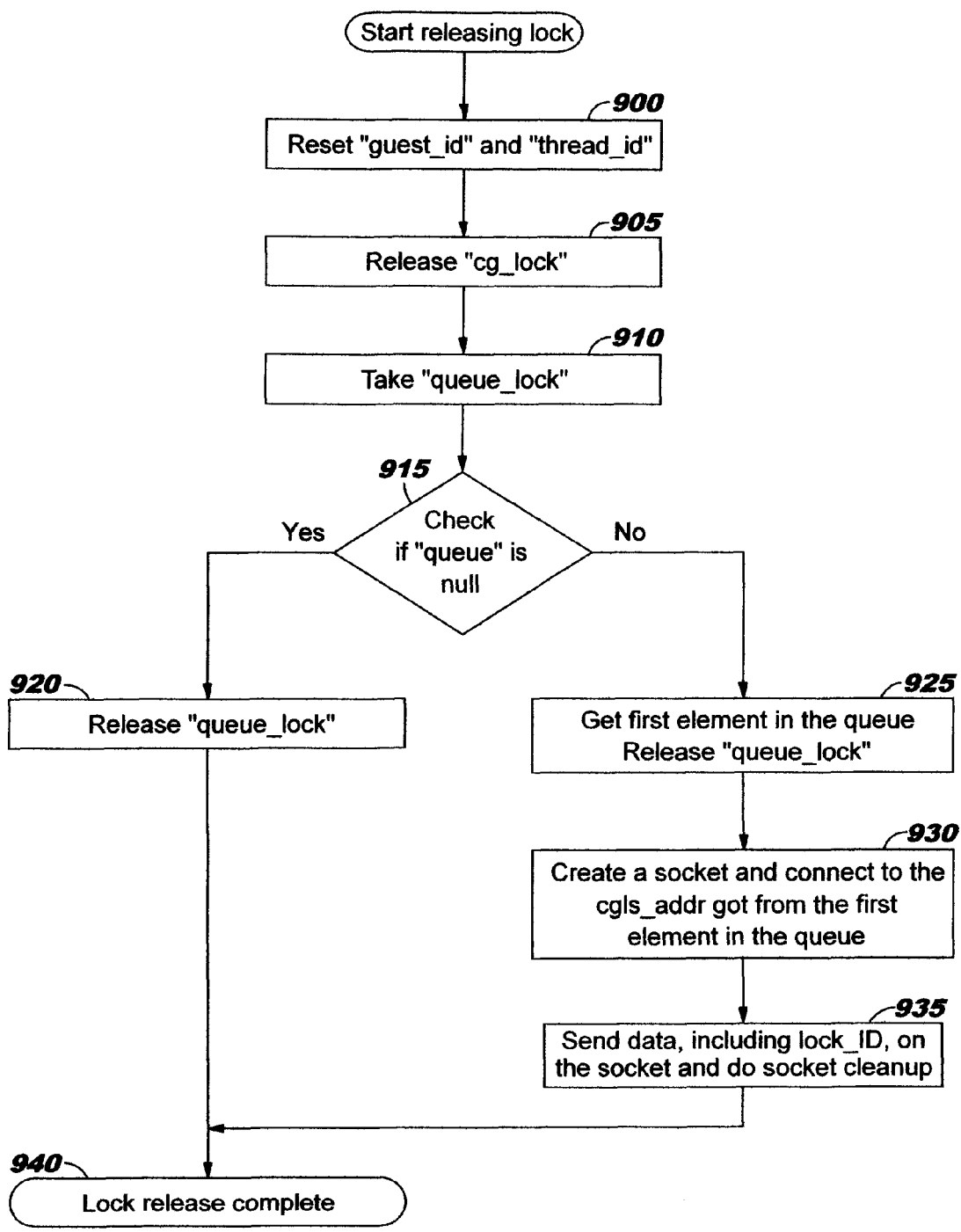
FIG. 9 provides a flowchart depicting logic which may be used when releasing a cross-guest lock in an aspect that provides a cross-guest locking service.

Note that socket operations in FIG. 9 are not intercepted, and thus these socket operations function in a similar manner as described for FIG. 3, as the lock release operations are expected to use a socket for very short duration and thus socket multiplexing is not deemed to be needed here.

Figure 10:
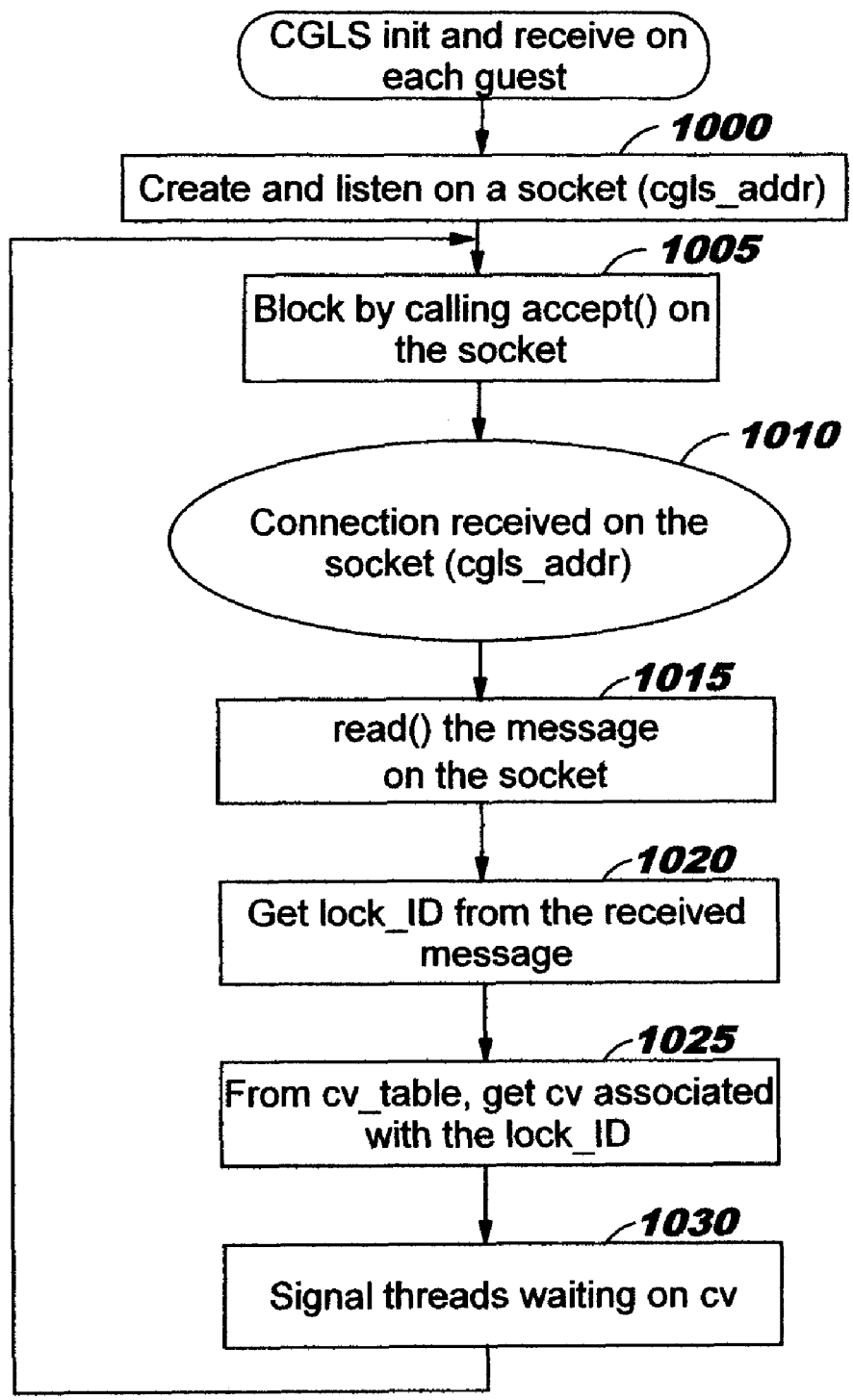
FIG. 10, a flowchart is provided depicting logic which may be used for a cross-guest locking service executing on a guest operating system.

Referring now to FIG. 10, a flowchart is provided depicting logic which may be used for a CGLS executing on a guest operating system, as will now be described.

In Block 1000, the CGLS creates and listens on a socket. This socket is referred to in FIG. 10 as having a socket address of "cgls_addr", and is also referred to herein as the "shared" socket. This shared socket will be used by the CGLS for listening for changes to all of the cross-guest locks so that the CGLS, upon receiving a message on the socket that indicates a release of a particular one of those cross-guest locks, can then wake up a thread which is waiting on that cross-guest lock. The socket is preferably created on an unused port, so that only messages pertaining to cross-guest locks will be received on this socket.

Block 1005 blocks by calling "accept( )" on the shared socket, and will remain blocked until a connection is received on that socket. Receiving the connection, indicated at Block 1010, will be triggered when a thread holding a cross-guest lock releases that lock and sends data (as discussed above with reference to Block 935 of FIG. 9).

Responsive to unblocking, Block 1015 issues a "read( )" message to remove the incoming message from the socket. Block 1020 then gets the "lock_ID" value from the received message. This "lock_ID" value is then used at Block 1025 to access the cv_table 780, thereby obtaining the condition variable associated with this particular lock identifier. The CGLS then signals (e.g., via notification message or broadcast) the thread or threads that are waiting on this condition variable at Block 1030 (causing those threads to begin processing from Block 835 of FIG. 8). Processing for the CGLS then returns to Block 1005 to again block on the shared socket in order to await the next notification of a released cross-guest lock.

In an aspect that provides fault tolerance with the cross-guest locking service enhancement, socket service failures are preferably detected and managed in a similar manner to the processing depicted in FIGS. 5-6, ensuring that threads fall back to spinlocks when a socket-related fault occurs. The cross-guest locking service can periodically attempt to re-establish broken sockets, thereby avoiding situations where threads fall back to spinlocks permanently.

Figure 11:
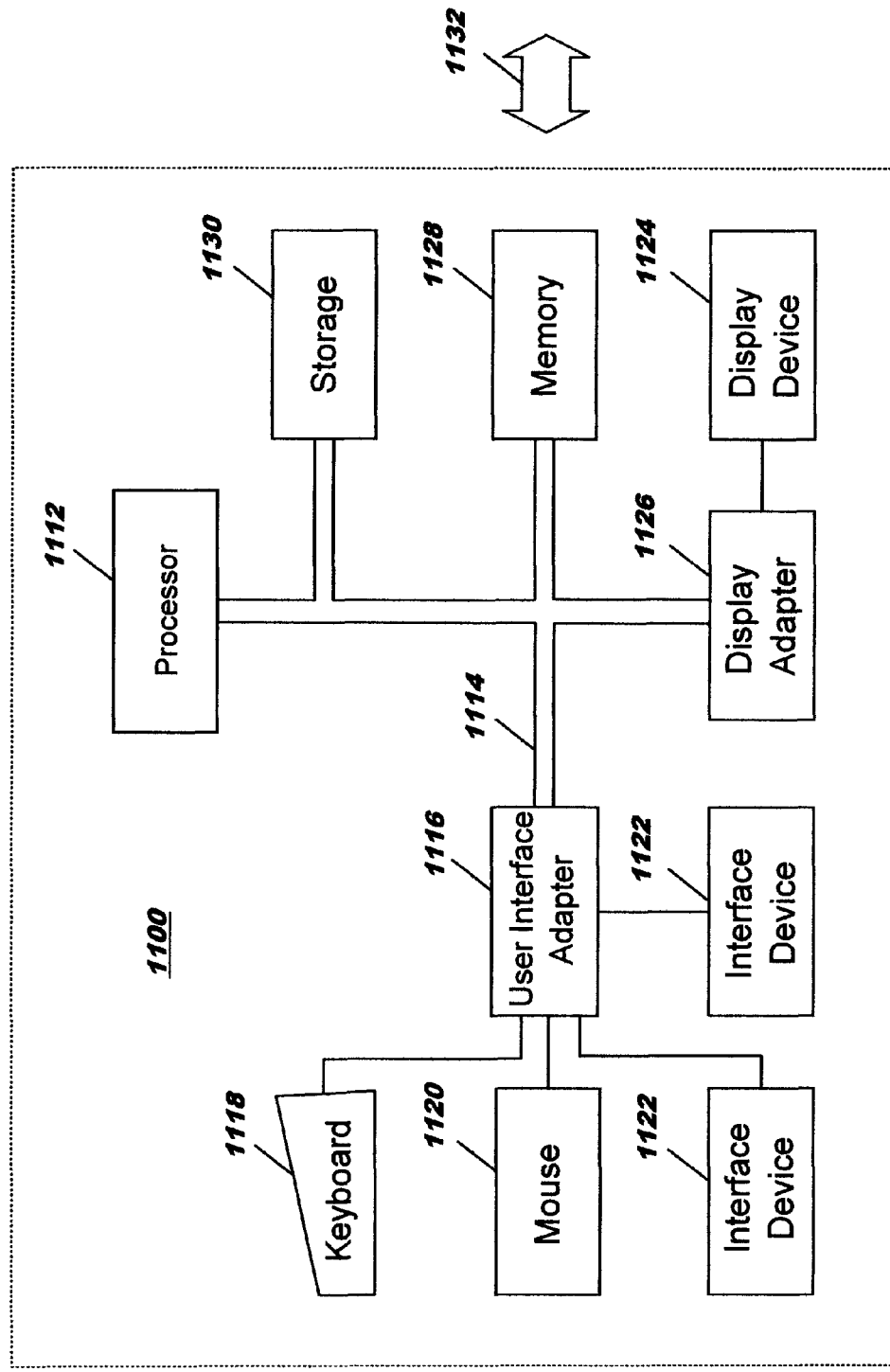
FIG. 11 depicts a data processing system suitable for storing and/or executing program code.

Referring now to FIG. 11, a data processing system 1100 suitable for storing and/or executing program code includes at least one processor 1112 coupled directly or indirectly to memory elements through a system bus 1114. The memory elements can include local memory 1128 employed during actual execution of the program code, bulk storage 1130, and cache memories (not shown) which provide temporary storage of at least some program code in order to reduce the number of times code must be retrieved from bulk storage during execution.

Input/output ("I/O") devices (including but not limited to keyboards 1118, displays 1124, pointing devices 1120, other interface devices 1122, etc.) can be coupled to the system either directly or through intervening I/O controllers or adapters (1116, 1126).

Network adapters may also be coupled to the system to enable the data processing system to become coupled to other data processing systems or remote printers or storage devices through intervening private or public networks (as shown generally at 1132). Modems, cable modem attachments, wireless adapters, and Ethernet cards are just a few of the currently-available types of network adapters.

Figure 12:
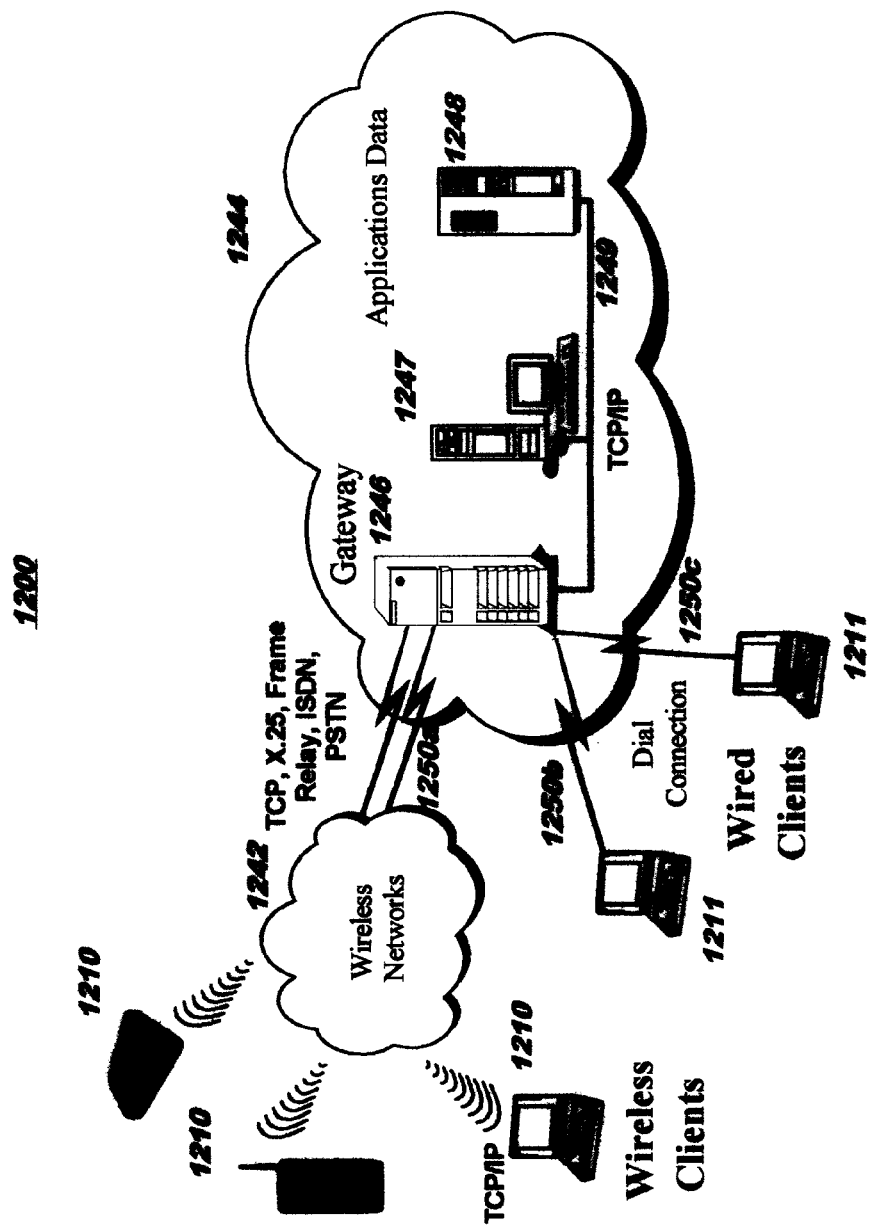
FIG. 12 depicts a representative networking environment in which one or more embodiments of the present invention may be used.

FIG. 12 illustrates a data processing network environment 1200 in which the present invention may be practiced. The data processing network 1200 may include a plurality of individual networks, such as wireless network 1242 and wired network 1244. A plurality of wireless devices 1210 may communicate over wireless network 1242, and a plurality of wired devices, shown in the figure (by way of illustration) as workstations 1211, may communicate over network 1244. Additionally, as those skilled in the art will appreciate, one or more local area networks ("LANs") may be included (not shown), where a LAN may comprise a plurality of devices coupled to a host processor.

Still referring to FIG. 12, the networks 1242 and 1244 may also include mainframe computers or servers, such as a gateway computer 1246 or application server 1247 (which may access a data repository 1248). A gateway computer 1246 serves as a point of entry into each network, such as network 1244. The gateway 1246 may be preferably coupled to another network 1242 by means of a communications link 1250a. The gateway 1246 may also be directly coupled to one or more workstations 1211 using a communications link 1250b, 1250c, and/or may be indirectly coupled to such devices. The gateway computer 1246 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks of IBM in the United States, other countries, or both, and "System i" is a trademark of IBM.)

The gateway computer 1246 may also be coupled 1249 to a storage device (such as data repository 1248).

Those skilled in the art will appreciate that the gateway computer 1246 may be located a great geographic distance from the network 1242, and similarly, the devices 1210, 1211 may be located some distance from the networks 1242 and 1244, respectively. For example, the network 1242 may be located in California, while the gateway 1246 may be located in Texas, and one or more of the devices 1210, 1211 may be located in Florida. The devices 1210 may connect to the wireless network 1242 using a networking protocol such as the Transmission Control Protocol/Internet Protocol ("TCP/IP") over a number of alternative connection media, such as cellular phone, radio frequency networks, satellite networks, etc. The wireless network 1242 preferably connects to the gateway 1246 using a network connection 1250a such as TCP or User Datagram Protocol ("UDP") over IP, X.25, Frame Relay, Integrated Services Digital Network ("ISDN"), Public Switched Telephone Network ("PSTN"), etc. The workstations 1211 may connect directly to the gateway 1246 using dial connections 1250b or 1250c. Further, the wireless network 1242 and network 1244 may connect to one or more other networks (not shown), in an analogous manner to that depicted in FIG. 12.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method of protecting a shared resource in a computing system, comprising:
storing, in shared memory accessible to at least a first thread and a second thread which execute concurrently in the computing system, a lock data structure for serializing access to the shared resource, the first thread executing under control of a first operating system hosted by the computing system and the second thread executing under control of a second operating system hosted by the computing system; and
upon detecting, by the first thread, that a lock provided by the lock data structure is already held by the second thread, performing, by the first thread:
using a socket to block while waiting for the lock to be released;
adding a waiter entry to a queue, the waiter entry specifying an address of the socket on which the first thread is blocking; and
receiving a notification from the second thread, on the socket, when the second thread releases the lock.

2. The method according to claim 1, wherein the socket is a network socket.

3. The method according to claim 1, wherein the socket is a cross-guest shared-memory socket.

4. The method according to claim 1, further comprising:
obtaining, by the second thread, the waiter entry from the queue when the second thread is releasing the lock;
using the address of the socket specified in the obtained waiter entry, by the second thread, to connect to the socket on which the first thread blocked; and
sending a message on the socket on which the first thread blocked, by the second thread, to notify the first thread when the second thread releases the lock.

5. The method according to claim 1, wherein the first thread uses a spinlock to suspend execution while waiting for the lock to be released, rather than using the socket to block, if the first thread encounters a socket error.

6. The method according to claim 1, wherein the first thread uses a spinlock to suspend execution while waiting for the lock to be released, rather than using the socket to block, if the first thread observes a variable setting that indicates that the second thread encountered a socket failure.

7. The method according to claim 1, wherein the first operating system executes a first cross-guest locking service and the second operating system executes a second cross-guest locking service, the first cross-guest locking service and the second cross-guest locking service providing a programming interface through which threads executing on the first and second operating systems invoke operations for holding and releasing the lock on the shared resource.

8. A system for protecting shared resources in a computing system, comprising:
   a computer comprising a processor; and
   instructions which are executable, using the processor, to implement functions comprising:
      storing, in shared memory accessible to at least a first thread and a second thread which execute concurrently in the computing system, a lock data structure for serializing access to one of the shared resources, the first thread executing under control of a first operating system hosted by the computing system and the second thread executing under control of a second operating system hosted by the computing system; and
      upon detecting, by the first thread, that a lock provided by the lock data structure is already held by the second thread, performing, by the first thread;
         using a socket to block while waiting for the lock to be released;
         adding a waiter entry to a queue, the waiter entry specifying an address of the socket on which the first thread is blocking; and
         receiving a notification from the second thread, on the socket, when the second thread releases the lock.

9. The system according to claim 8, wherein the socket comprises one of a network socket, a cross-guest shared-memory socket, or communication technology that provides socket-like service between the first operating system and the second operating system.

10. The system according to Claim 8, wherein the functions further comprise:
    obtaining, by the second thread, the waiter entry from the queue when the second thread is releasing the lock;
    using the address of the socket specified in the obtained waiter entry, by the second thread, to connect to the socket on which the first thread blocked; and
    sending a message on the socket on which the first thread blocked, by the second thread, to notify the first thread when the second thread releases the lock.

11. The system according to claim 8, wherein the first thread uses a spinlock to suspend execution while waiting for the lock to be released, rather than using the socket to block, if the first thread encounters a socket error or observes a variable setting that indicates that the second thread encountered a socket failure.

12. A computer program product for protecting shared resources in a computing system, the computer program product comprising:
    a computer readable storage medium having computer readable program code embodied therein, the computer readable program code configured for:
       storing, in shared memory accessible to at least a first thread and a second thread which execute concurrently in the computing system, a lock data structure for serializing access to one of the shared resources, the first thread executing under control of a first operating system hosted by the computing system and the second thread executing under control of a second operating system hosted by the computing system; and
       upon detecting, by the first thread, that a lock provided by the lock data structure is already held by the second thread, performing, by the first thread;
          using a socket to block while waiting for the lock to be released;
          adding a waiter entry to a queue, the waiter entry specifying an address of the socket on which the first thread is blocking; and
          receiving a notification from the second thread, on the socket, when the second thread releases the lock.

13. The computer program product according to claim 12, wherein the socket comprises one of a network socket or a cross-guest shared-memory socket.

14. The computer program product according to Claim 12, wherein the computer readable program code is further configured for:
    obtaining, by the second thread, the waiter entry from the queue when the second thread is releasing the lock;
    using the address of the socket specified in the obtained waiter entry, by the second thread, to connect to the socket on which the first thread blocked; and
    sending a message on the socket on which the first thread blocked, by the second thread, to notify the first thread when the second thread releases the lock.

15. The computer program product according to claim 12, wherein the first thread uses a spinlock to suspend execution while waiting for the lock to be released, rather than using the socket to block, if the first thread encounters a socket error or observes a variable setting that indicates that the second thread encountered a socket failure.

16. The computer program product according to claim 12, wherein the first operating system executes a first cross-guest locking service and the second operating system executes a second cross-guest locking service, the first cross-guest locking service and the second cross-guest locking service providing a programming interface through which threads executing on the first and second operating systems invoke operations for holding and releasing the lock on the shared resource.

* * * * *